United States Patent
Chou et al.

(10) Patent No.: US 11,866,533 B2
(45) Date of Patent: Jan. 9, 2024

(54) ANTI-BIOFOULING COPOLYMER AND METHOD FOR PREPARING THE SAME

(71) Applicant: Southern Taiwan University of Science and Technology, Tainan (TW)

(72) Inventors: Ying-Nien Chou, Kaohsiung (TW); Ming-Zu Ou, Tainan (TW); Yu-Chan Wu, Tainan (TW); Po-Ching Lee, Tainan (TW)

(73) Assignee: SOUTHERN TAIWAN UNIVERSITY OF SCIENCE AND TECHNOLOGY, Tainan (TW)

( * ) Notice: Subject to any disclaimer, the term of this patent is extended or adjusted under 35 U.S.C. 154(b) by 0 days.

(21) Appl. No.: 17/984,026

(22) Filed: Nov. 9, 2022

(65) Prior Publication Data
US 2023/0142176 A1   May 11, 2023

(30) Foreign Application Priority Data
Nov. 10, 2021 (TW) ................. 110141885

(51) Int. Cl.
*C08F 220/38* (2006.01)
*C09D 133/14* (2006.01)
*C09D 5/16* (2006.01)

(52) U.S. Cl.
CPC ........ *C08F 220/387* (2020.02); *C09D 5/1662* (2013.01); *C09D 133/14* (2013.01)

(58) Field of Classification Search
CPC .................. C08F 220/387; C09D 133/14
See application file for complete search history.

(56) References Cited

U.S. PATENT DOCUMENTS

2015/0197644 A1*  7/2015  Chang ............... A61L 27/34
                                                    427/2.24

* cited by examiner

*Primary Examiner* — Catherine S Branch
(74) *Attorney, Agent, or Firm* — Muncy, Geissler, Olds & Lowe, P.C.

(57) ABSTRACT

Disclosed herein is an anti-biofouling copolymer including a first structural unit represented by formula (I) and a second structural unit represented by formula (II),

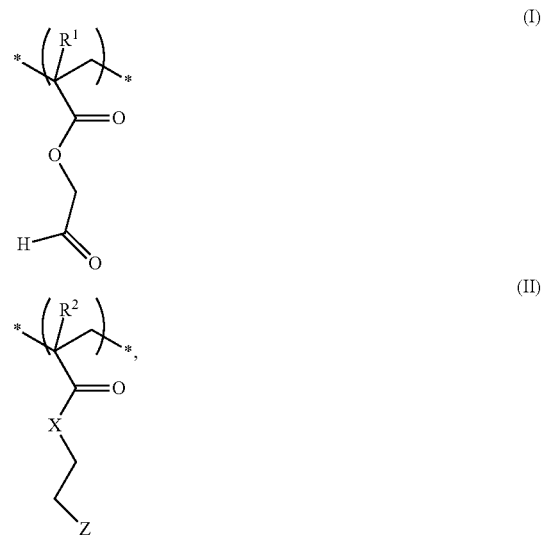

wherein each of the substituents is given the definition as set forth in the Specification and Claims. Also disclosed herein is a method for preparing an anti-biofouling copolymer which includes subjecting a first compound represented by (Continued)

formula (a) to polymerization reaction with a second compound represented by formula (b), wherein each of the substituents is given the definition as set forth in the Specification and Claims.

8 Claims, 5 Drawing Sheets

ANTI-BIOFOULING COPOLYMER AND METHOD FOR PREPARING THE SAME

CROSS-REFERENCE TO RELATED APPLICATION

This application claims priority to Taiwanese Invention Patent Application No. 110141885, filed on Nov. 10, 2021.

FIELD

The present disclosure relates to a copolymer, and more particularly to an anti-biofouling copolymer. The present disclosure also relates to a method for preparing the anti-biofouling copolymer.

BACKGROUND

Taiwanese Invention Patent No. I629320 B discloses an anti-biofouling material and a method for preparing the same. The anti-biofouling material includes a substrate and a coating layer that is fixedly disposed on a surface of the substrate by covalent bonding. Examples of the substrate include glass, metal, metal oxide, ceramic, silicon wafer, and plastic. The coating layer includes a copolymer which is formed by subjecting a first monomer having an epoxy group and a second monomer having a zwitterionic group that is one of sulfobetaine and carboxybetaine. Examples of biological materials that might adhere on the anti-biofouling material include fibrinogen, platelets, red blood cells, tissue cells, and *Escherichia coli*.

A method for making the anti-biofouling material includes the steps of: (1) providing the substrate; (2) performing an activation procedure on the surface of the substrate by introducing functional group thereon, the functional groups including hydroxyl, amine and thiol groups; (3) providing a copolymer synthesized by polymerization of first monomers having an epoxy group and second monomers having a zwitterionic group; and (4) performing a reaction at a pH value ranging from 1 to 5 or 8 to 11 such that covalent bonds are formed between the copolymer and the functional groups on the surface of the substrate, thereby obtaining the anti-biofouling material.

Although the aforesaid copolymer could confer anti-biofouling property to the substrate, unstability of the epoxy groups of the copolymer would cause the copolymer easily undergoes self-crosslinking reaction, resulting in poor grafting between the copolymer and the functional groups on the surface of the substrate, thereby adversely affecting the anti-biofouling property of the anti-biofouling material. In addition, the self-crosslinking reaction of the copolymer would cause generation of sticky aggregates, which is not conducive to use of the copolymer, resulting in difficulty of uniformly grafting the copolymer on the surface of the substrate. Therefore, there is a need to improve the property of the copolymer.

SUMMARY

Therefore, in a first aspect, the present disclosure provides an anti-biofouling copolymer which can alleviate at least one of the drawbacks of the prior art.

The anti-biofouling copolymer includes a first structural unit represented by formula (I) and a second structural unit represented by formula (II), (I)

(II)

A molar ratio of the first structural unit represented by formula (I) to the second structural unit represented by formula (II) ranges from 20:80 to 40:60, $R^1$ and $R^2$ independently represent hydrogen or methyl, X represents O or NH, and Z represents $N^+(CH_3)_2-(CH_2)_3-SO_3^-$.

In a second aspect, the present disclosure provides a method for preparing an anti-biofouling copolymer, which can alleviate at least one of the drawbacks of the prior art.

The method includes subjecting a first compound represented by formula (a) to a polymerization reaction with a second compound represented by formula (b), (a)

(b)

A molar ratio of the first compound represented by formula (a) to the second compound represented by formula (b) ranges from 20:80 to 40:60, $R^3$ and $R^4$ independently represent hydrogen or methyl, $X^1$ represents O or NH, and $Z^1$ represents $N^+(CH_3)_2-(CH_2)_3-SO_3^-$.

BRIEF DESCRIPTION OF THE DRAWINGS

Other features and advantages of the present disclosure will become apparent in the following detailed description of the embodiment(s) with reference to the accompanying drawings. It is noted that various features may not be drawn to scale.

DETAILED DESCRIPTION

Before the present disclosure is described in greater detail, it should be noted that if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprises" has a corresponding meaning.

Unless otherwise defined, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

The present disclosure provides an anti-biofouling copolymer which includes a first structural unit represented by formula (I) and a second structural unit represented by formula (II), wherein a molar ratio of the first structural unit represented by formula (I) to the second structural unit represented by formula (II) ranges from 20:80 to 40:60, $R^1$ and $R^2$ independently represent hydrogen or methyl, X represents O or NH, and Z represents $N^+(CH_3)_2—(CH_2)_3—SO_3^-$.

In certain embodiments, $R^1$ and $R^2$ independently represent methyl.

In certain embodiments, X represent O.

In certain embodiments, the molar ratio of the first structural unit represented by formula (I) to the second structural unit represented by formula (II) is 20:80.

The present disclosure also provides a method for preparing an anti-biofouling copolymer which includes subjecting a first compound represented by formula (a) to a polymerization reaction with a second compound represented by formula (b), wherein $R^3$ and $R^4$ independently represent hydrogen or methyl, $X^1$ represents O or NH, $Z^1$ represents $N^+(CH_3)_2—(CH_2)_3—SO_3^-$, and a molar ratio of the first compound represented by formula (a) to the second compound represented by formula (b) ranges from 20:80 to 40:60.

In certain embodiments, the first compound represented by formula (a) is $CH_2=C(CH_3)—C(O)—O—CH_2—C(O)H$. In certain embodiments, $CH_2=C(CH_3)—C(O)—O—CH_2—C(O)H$ is prepared by subjecting hydroxyethyl methacrylate to an oxidation reaction such that hydroxyl group therein is oxidized to aldehyde group. In certain embodiments, $CH_2=C(CH_3)—C(O)—O—CH_2—C(O)H$ is prepared by subjecting glycidyl methacrylate to an oxidation reaction such that epoxy group therein is oxidized to aldehyde group.

In certain embodiments, the second compound represented by formula (b) is sulfobetaine methacrylate.

In certain embodiments, the molar ratio of the first compound represented by formula (a) to the second compound represented by formula (b) is 20:80.

In certain embodiments, the polymerization reaction is performed under a nitrogen atmosphere. In certain embodiments, the polymerization reaction is performed at 60° C. In certain embodiments, the polymerization reaction is performed for 6 hours.

The present disclosure will be described by way of the following examples. However, it should be understood that the following examples are intended solely for the purpose of illustration and should not be construed as limiting the present disclosure in practice.

EXAMPLES

Preparation of Anti-Biofouling Copolymer

Example 1 (EX1)

First, 0.3121 g (2.44 mmol) of $CH_2=C(CH_3)-C(O)-O-CH_2-C(O)H$, 0.02 g of azobisisobutyronitrile, and 11.377 g of methanol were mixed to form a first solution, while 2.722 g (9.74 mmol) of sulfobetaine methacrylate and 3.792 g of water were mixed to form a second solution. Next, the first solution was subjected to a reaction with the second solution by mixing, heating to 60° C. under nitrogen atmosphere, and stirring at a speed of 300 rpm for 6 hours, so as to form a first mixture including an anti-biofouling copolymer. The first mixture was then placed on an ice-water bath at 0° C. for 10 minutes to stop the reaction, so as to obtain a second mixture including a viscous substance that includes the anti-biofouling copolymer and an unreacted solution. Thereafter, the unreacted solution was removed from the second mixture, and methanol was then added to precipitate the anti-biofouling copolymer from the viscous substance, followed by filtration, so as to obtain the anti-biofouling copolymer of EX1. The anti-biofouling copolymer was subjected to a freeze-drying treatment using a vacuum oven and a freeze-dryer in sequence.

Examples 2 and 3 (EX2 and EX3)

The anti-biofouling copolymers of EX2 and EX3 were prepared using substantially similar procedures and conditions as those of EX1, except that, in EX2, the amount of $CH_2=C(CH_3)-C(O)-O-CH_2-C(O)H$ used to prepare the first solution was 0.4681 g (3.654 mmol), the amount of sulfobetaine methacrylate used to prepare the second solution was 2.382 g (8.526 mmol), and a molar ratio of $CH_2=C(CH_3)-C(O)-O-CH_2-C(O)H$ to sulfobetaine methacrylate was 30:70; whereas in EX3, the amount of $CH_2=C(CH_3)-C(O)-O-CH_2-C(O)H$ used to prepare the first solution was 0.6242 g (4.872 mmol), the amount of sulfobetaine methacrylate used to prepare the second solution was 2.041 g (7.308 mmol), and a molar ratio of $CH_2=C(CH_3)-C(O)-O-CH_2-C(O)H$ to sulfobetaine methacrylate was 40:60.

Structural Analysis of Anti-Biofouling Copolymers of EX1 and EX3

Figure 1:
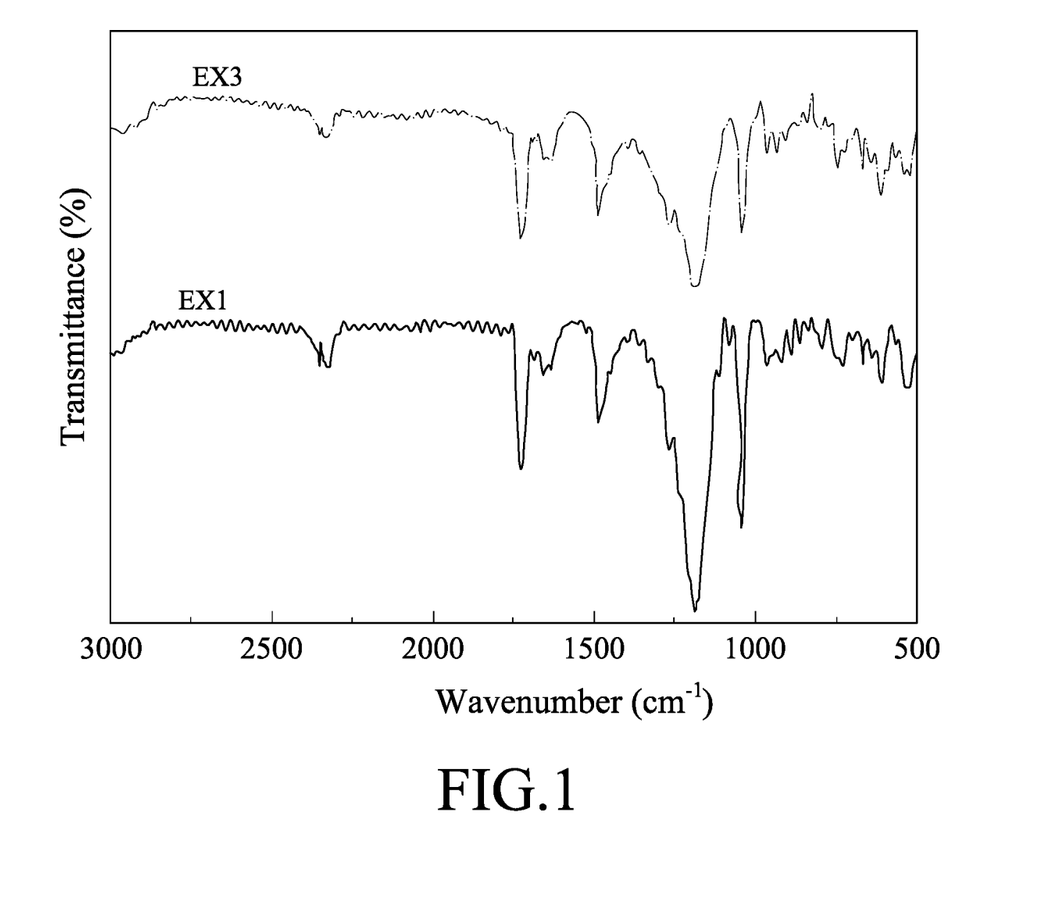
FIG. 1 shows an infrared spectra of anti-biofouling copolymers of Examples 1 and 3 according to the present disclosure.
Figure 2:
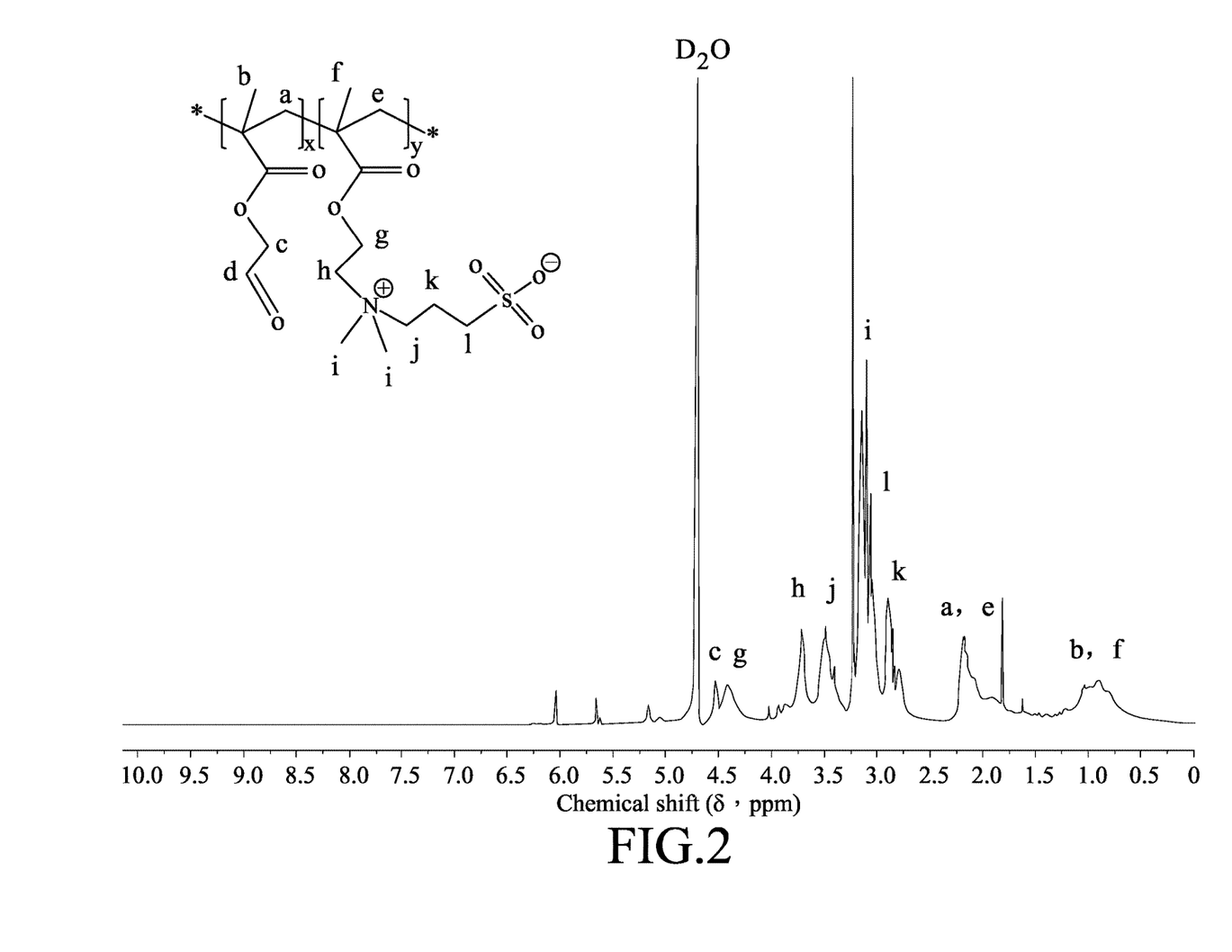
FIG. 2 shows a nuclear magnetic resonance spectrum of the anti-biofouling copolymer of Example 2 according to the present disclosure.

The anti-biofouling copolymers of EX1 and EX3 were respectively subjected to infrared spectroscopy, and the anti-biofouling copolymer of EX1 was further subjected to nuclear magnetic resonance spectroscopy, and the results are shown in FIGS. 1 and 2.

FIG. 1 shows infrared spectra of anti-biofouling copolymers of EX1 and EX3. As shown in FIG. 1, a peak at 1047 $cm^{-1}$ was attributed to sulfonic acid group ($-SO_3H$) of sulfobetaine methacrylate, a peak at 1650 $cm^{-1}$ was attributed to quaternary amine of sulfobetaine methacrylate, a peak at 1700 $cm^{-1}$ was attributed to carbonyl group ($-C=O$) of the ester group of sulfobetaine methacrylate, a peak at 2989 $cm^{-1}$ was attributed to $C-H$ of the aldehyde group of $CH_2=C(CH_3)-C(O)-O-CH_2-C(O)H$, a peak at 1776 $cm^{-1}$ was attributed to carbonyl group ($-C=O$) of the aldehyde group of $CH_2=C(CH_3)-C(O)-O-CH_2-C(O)H$, and a peak at 1719 $cm^{-1}$ was attributed to carbonyl group ($-C=O$) of the ester group of $CH_2=C(CH_3)-C(O)-O-CH_2-C(O)H$, indicating that the anti-biofouling copolymers of EX1 and EX3 are indeed obtained.

FIG. 2 shows a nuclear magnetic resonance spectrum of the anti-biofouling copolymer of EX1. As shown in FIG. 2, a peak at $\delta=4.45$ ppm was attributed to $CH_2$ of $CH_2=C(CH_3)-C(O)-O-CH_2-C(O)H$, and a peak at $\delta=3.09$ ppm was attributed to hydrogen in $-N^+(CH_3)_2$ of sulfobetaine methacrylate, indicating that the anti-biofouling copolymer of EX1 is indeed obtained.

Comparative Examples 1 and 2 (CE1 and CE2)

The anti-biofouling copolymers of CE1 and CE2 were prepared using substantially similar procedures and conditions as those of EX1, except that, in CE1, the amount of $CH_2=C(CH_3)-C(O)-O-CH_2-C(O)H$ used to prepare the first solution was 0.1561 g (1.218 mmol), the amount of sulfobetaine methacrylate used to prepare the second solution was 3.062 g (10.962 mmol), and a molar ratio of $CH_2=C(CH_3)-C(O)-O-CH_2-C(O)H$ to sulfobetaine methacrylate was 10:90; whereas in CE2, the amount of $CH_2=C(CH_3)-C(O)-O-CH_2-C(O)H$ used to prepare the first solution was 0.9362 g (7.308 mmol), the amount of sulfobetaine methacrylate used to prepare the second solution was 1.361 g (4.872 mmol), and a molar ratio of $CH_2=C(CH_3)-C(O)-O-CH_2-C(O)H$ to sulfobetaine methacrylate was 60:40.

Application Example 1 (AEX1)

A silicon wafer serving as a substrate and having a size of 1 cm×1 cm was cleaned with acetone, and then dried with nitrogen to obtain a cleaned silicon wafer. A surface of the cleaned silicon wafer was irradiated with an ultraviolet ozone device (Manufacturer: Sadhu Design Corporation; Model no.: UVC10) for 30 minutes, so as to form a silicon wafer having hydroxyl groups on the surface thereof. Next, the silicon wafer having hydroxyl groups was immersed in a solution containing 5 mL of toluene and 0.872 µL of (3-aminopropyl)triethoxysilane, followed by being left standing for reaction to proceed at 37° C. for 30 minutes, such that the hydroxyl groups of the silicon wafer were reacted with (3-aminopropyl)triethoxysilane, thereby forming a silicon wafer with amine groups on the surface thereof.

Meanwhile, 3.0 mg of the anti-biofouling copolymer of EX1 was mixed with 3.0 mL of water to form an anti-biofouling copolymer solution, in which the concentration of the anti-biofouling copolymer of EX1 was 1.0 mg/mL. Thereafter, the silicon wafer with amine groups was immersed in the anti-biofouling copolymer solution, followed by conducting a grafting reaction in a shaking oven at 60° C. under a speed of 110 rpm for 24 hours, such that the anti-biofouling copolymer was grafted onto the surface of the silicon wafer, so as to form an anti-biofouling silicon wafer of AEX1.

Application Examples 2 and 3 (AEX2 and AEX3)

The anti-biofouling silicon wafers of AEX2 and AEX3 were prepared using substantially similar procedures and conditions as those of AEX1, except that, in AEX2, the anti-biofouling copolymer solution was formed by mixing the anti-biofouling copolymer of EX2 with water, and in AEX3, the anti-biofouling copolymer solution was formed by mixing the anti-biofouling copolymer of EX3 with water.

Comparative Application Examples 1 and 2 (CAE1 and CAE2)

The anti-biofouling silicon wafers of CAE1 and CAE2 were prepared using substantially similar procedures and conditions as those of AE1, except that, in CAE1, the anti-biofouling copolymer solution was formed by mixing the anti-biofouling copolymer of CE1 with water, and in CAE2, the anti-biofouling copolymer solution was formed by mixing the anti-biofouling copolymer of CE2 with water.

For clarity, for each of the anti-biofouling silicon wafers of AEX1 to AEX3 and CAE1 to CAE2, the molar ratio of $CH_2=C(CH_3)-C(O)-O-CH_2-C(O)H$ to sulfobetaine methacrylate, the molecular weight and concentration of the anti-biofouling copolymer, and the temperature and time period of the grafting reaction, are summarized and shown in Table 1 below.

TABLE 1

| | Anti-biofouling copolymer | | | Grafting reaction | |
|---|---|---|---|---|---|
| | Molar ratio of $CH_2=C(CH_3)-C(O)-O-CH_2-C(O)H$ to sulfobetaine methacrylate | Molecular weight (kDa) | Concentration (mg/mL) | Temperature | Time period (hours) |
| AEX1 | 20:80 | 46.8 | 5.0 | 60 | 6 |
| AEX2 | 30:70 | 38.3 | 5.0 | 60 | 6 |
| AEX3 | 40:60 | 35.0 | 5.0 | 60 | 6 |
| CAE1 | 10:90 | 32.6 | 5.0 | 60 | 6 |
| CAE2 | 60:40 | 43.2 | 5.0 | 60 | 6 |

Application Example 4 (AEX4)

Polymeric material, such as polysaccharide hydrogels, are commonly used for biomedical applications, e.g., wound dressing, artificial skin, etc., and thus, should have good anti-biofouling property, so as to avoid causing secondary damage to the wounds or growth of bacteria thereon. Therefore, in order to determine whether a chitosan hydrogel grafted with the anti-biofouling copolymer of the present disclosure has good anti-biofouling property, the following experiments were performed.

First, 0.75 g of chitosan was dissolved in 0.5 M acetic acid to form a solution with 1.5 wt % chitosan based on a total weight of the solution, which was then poured into a mold to be dried. Next, 4 M of sodium hydroxide solution was added to allow the chitosan to undergo self-crosslinking, followed by rinsing the chitosan with deionized water for 3 to 5 times to achieve a pH of about 7, so as to form a chitosan hydrogel. Thereafter, the chitosan hydrogel was cut to have a diameter of 1 cm using a stainless steel pipette, and then rinsed 3 times with deionized water.

Meanwhile, 5 mg of the anti-biofouling copolymer of EX1 was mixed with 25 mL of deionized water to form an anti-biofouling copolymer solution, in which the concentration of the anti-biofouling copolymer was 5 mg/mL, and in which a molar ratio of $CH_2=C(CH_3)-C(O)-O-CH_2-C(O)H$ to sulfobetaine methacylate was 20:80. After that, the chitosan hydrogel was immersed in the anti-biofouling copolymer solution, followed by conducting a grafting reaction in a shaking oven at 60° C. under a speed of 110 rpm for 24 hours, such that the anti-biofouling copolymer was grafted onto the surface of the chitosan hydrogel, which was then placed into a clean scintillation vial. Subsequently, 20 mL of distilled water was added into the scintillation vial, followed by conducting ultrasonic vibration for 10 minutes to remove any anti-biofouling copolymer that was not grafted to the surface of the chitosan hydrogel. Finally, the chitosan hydrogel grafted with the anti-biofouling copolymer was removed from the scintillation vial, and then washed 3 times with deionized water, so as to obtain an anti-biofouling chitosan hydrogel of AEX4. The anti-biofouling chitosan hydrogel of AEX4 was then transferred into a 24-well plate to be stored at 4° C.

For clarity, the molar ratio of $CH_2=C(CH_3)-C(O)-O-CH_2-C(O)H$ to sulfobetaine methacrylate, the molecular weight and concentration of the anti-biofouling copolymer, and the temperature and time period of the grafting reaction, are summarized and shown in Table 2 below.

TABLE 2

| | Anti-biofouling copolymer | | | Grafting reaction | |
|---|---|---|---|---|---|
| | Molar ratio of $CH_2=C(CH_3)-C(O)-O-CH_2-C(O)H$ to sulfobetaine methacrylate | Molecular weight (kDa) | Concentration (mg/mL) | Temperature | Time period (hours) |
| AEX4 | 20:80 | 46.8 | 5.0 | 60 | 6 |

Control Chitosan Hydrogel

The chitosan hydrogel as described in AEX4, which was not grafted with the anti-biofouling copolymer, directly serves as a control test sample.

X-Ray Photoelectron Spectroscopy Analysis

Figure 3:
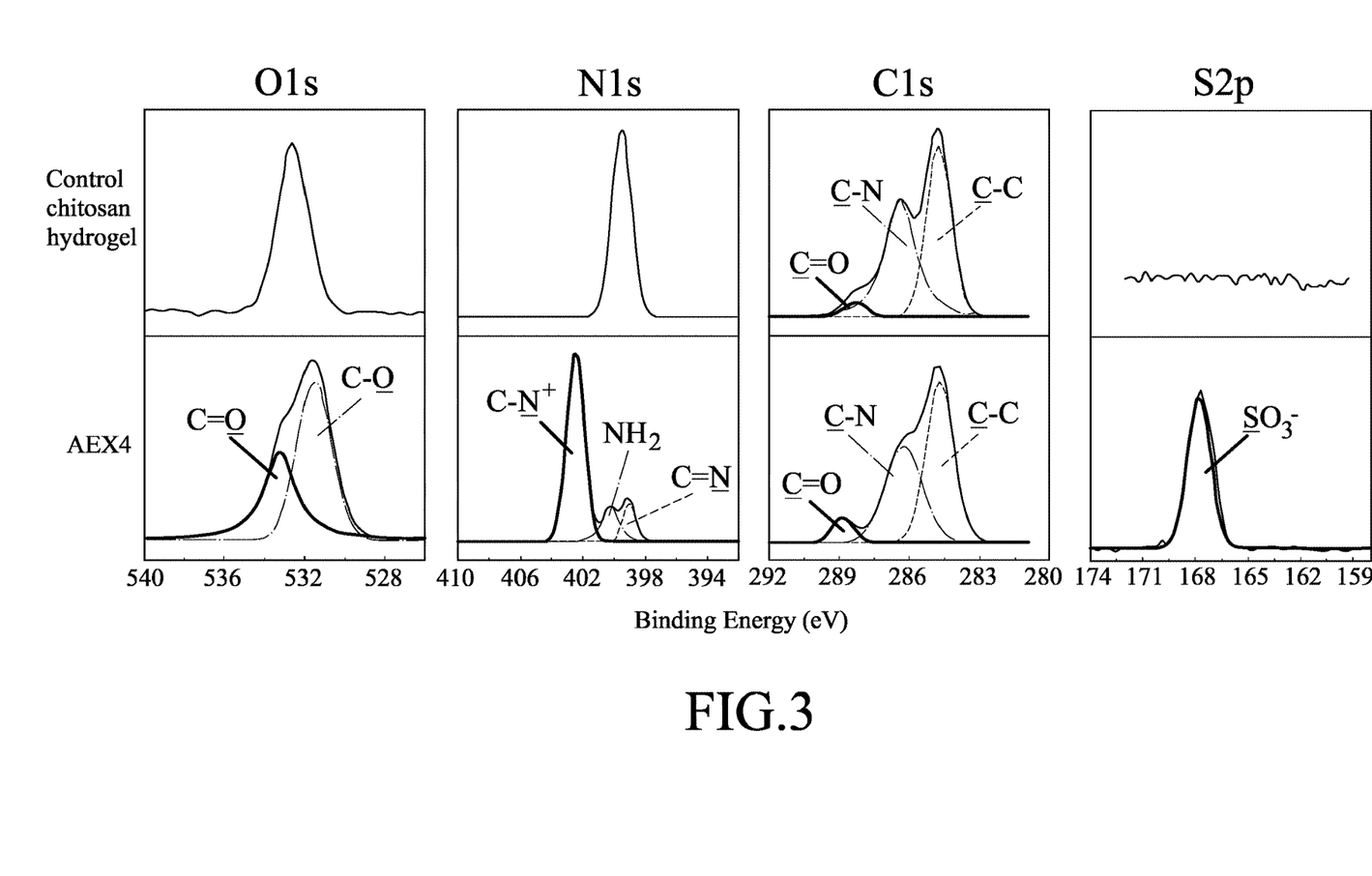
FIG. 3 shows the X-ray photoelectron spectroscopy spectra of anti-biofouling chitosan hydrogel of Application Example 4 and control chitosan hydrogel.

In order to determine whether the anti-biofouling copolymer was grafted to the chitosan hydrogel, and to determine the elemental composition of the surface of a respective one of the anti-biofouling chitosan hydrogel of AEX4 and the control chitosan hydrogel, as well as the chemical state of the elements, each of the anti-biofouling chitosan hydrogel of AEX4 and the control chitosan hydrogel was subjected to X-ray photoelectron spectroscopy (XPS) analysis using techniques well-known to those skilled in the art, and the results are shown in FIG. 3.

FIG. 3 shows the XPS spectra of the anti-biofouling chitosan hydrogel of AEX4 and the control chitosan hydrogel of CAE4. As shown in FIG. 3, in comparison with the control chitosan hydrogel of CAE4, the N1s XPS spectrum of the anti-biofouling chitosan hydrogel of AEX4 had one major peak and two minor peaks. The major peak was assigned to C—$N^+$ bonding resulting from the nucleophilic addition reaction of the amine group of the chitosan hydrogel with the aldehyde group of the anti-biofouling copolymer, and the two minor peaks were assigned to $NH_2$ formation and C=N bonding, respectively. In addition, the S2p XPS spectrum of the anti-biofouling chitosan hydrogel of AEX4 had one major peak which was assigned to $SO_3^-$ formation, while no peak was observed in the control chitosan hydrogel. These results indicate that in the anti-biofouling chitosan hydrogel of AEX4, the anti-biofouling copolymer was indeed grafted to the chitosan hydrogel.

Property Evaluation

Methods:

1. Relative Protein Adhesion Percentage

A respective one of the anti-biofouling silicon wafers of AEX1 to AEX3, CAE1 and CAE2, the anti-biofouling chitosan hydrogel of AEX4, and the control chitosan hydrogel of CAE4 (collectively referred to as "test samples" hereinafter) was placed into a 1.0 mL of phosphate-buffered saline (PBS), and then placed in a hot air circulating oven at 37° C. for 30 minutes. After removal of PBS, each of the test samples was rinsed 3 times with fresh PBS. Next, the test sample was immersed in 1.0 mL of a bovine serum albumin (BSA) solution (Manufacturer: Sigma-Aldrich; Catalogue no.: A7030-10G), and then placed in the hot air circulating oven at 37° C. for 30 minutes. After that, the BSA solution was aspirated from the test sample using a pipette, and then the test sample was rinsed 3 times with fresh PBS. Thereafter, the test sample on which the BSA might adhere was immersed in a 1.0 mL bicinchoninic acid (BCA) solution (Manufacturer: Visual Protein; Catalogue no.: BC03-500), and then placed in the hot air circulating oven at 37° C. for 30 minutes. After that, 200 μL of the resultant solution containing the BSA was aspirated from the test sample using the pipette and transferred into a 96-well plate, and then subjected to light absorbance measurement at a wavelength of 562 nm ($OD_{562}$) using a microplate spectrophotometer (Manufacturer: BMG Labtech; Model no.: SPECTROstar Nano). Relative protein adhesion percentage on each of the test sample was determined based on pre-established BSA adsorption calibration curve. The result for the anti-biofouling silicon wafers of AEX1 to AEX3, CAE1 and CAE2 are shown in Table 3 below, and that for the anti-biofouling chitosan hydrogel of AEX4, and the control chitosan hydrogel of CAE4 are shown in Table 4 below.

2. Red Blood Cell Adhesion

Blood was drawn from a healthy human donor, and then transferred into a blood bag containing anticoagulant, i.e., sodium citrate, so as to obtain a blood sample. The blood sample was subjected to fractionation by centrifuging at a centrifugal force of 130 rcf for 10 minutes, and then the bottom layer of the resultant blood centrifugation product, i.e., the liquid of the hematocrit layer containing red blood cells, was aspirated out. Meanwhile, a respective one of the anti-biofouling silicon wafers of AEX1 to AEX3, CAE1, and CAE2 (collectively referred to as "test samples" hereinafter) each having a size of 1 $cm^2$, was transferred into a 24-well plate, and then 1.0 mL of PBS was added into each of the wells, followed by incubation in an incubator at 37° C. for 12 hours. After removal of PBS, each of the test samples was rinsed 3 times with fresh PBS. Next, the test sample was immersed in 1.0 mL of the liquid of the hematocrit layer containing red blood cells, and then placed in the incubator at 37° C. for 1 hour. After removal of the liquid of the hematocrit layer, each of the test samples was rinsed 3 times with fresh PBS. It should be noted that the surface of the test sample was not rinsed so as to prevent the red blood cells of the hematocrit layer which might adhere to the surface of the test sample from being washed away. Thereafter, the test sample on which the red blood cells might adhere was immersed in a 1.0 mL of a glutaraldehyde solution (Manufacturer: Sigma-Aldrich; Catalogue no.: 49629-250 ML) that has a concentration of 2.5 wt % and that is prepared by mixing glutaraldehyde and PBS, and then left standing at 25° C. for 3 hours. After removal of the glutaraldehyde solution, the test sample was rinsed 3 times with fresh PBS, and then dried using a lens cleaning tissue. Subsequently, the test sample was subjected to imaging and photography using an inverted phase contrast fluorescence microscope (Brand: Nexcope; Model no.: NIB410) of inverted fluorescence microscope system (Manufacturer: Guangzhou Micro-shot Technology Co., Ltd.; Brand: MShot; Model no.: MSG0), and the resultant images were analyzed using Image J software, so as to determine the number of red blood cells adhering to the test sample. The results are shown in Table 3 below.

3. Platelet Adhesion

Blood was drawn from a healthy human donor, and then transferred into a blood bag containing anticoagulant, i.e., sodium citrate, so as to obtain a blood sample. The blood sample was subjected to fractionation by centrifuging at a centrifugal force of 1500 rcf for 10 minutes, and then the intermediate thin layer of the resultant blood centrifugation product, i.e., the liquid of the buffy coat layer containing platelets having a concentration of greater than $1\times10^4$ counts/μL, was aspirated out. Meanwhile, a respective one of the anti-biofouling silicon wafers of AEX1 to AEX3, CAE1, and CAE2 (collectively referred to as "test samples" hereinafter) each having a size of 1 $cm^2$, was transferred into a 24-well plate, and then 1.0 mL of PBS was added into each of the wells, followed by incubation in an incubator at 37° C. for 12 hours. After removal of PBS, each of the test samples was rinsed 3 times with fresh PBS. Next, the test sample was immersed in 1.0 mL of the liquid of the buffy coat layer containing platelets, and then placed in the incubator at 37° C. for 1 hour. After removal of the liquid of the buffy coat layer, each of the test samples was rinsed 3 times with fresh PBS. It should be noted that the surface of the test sample was not rinsed so as to prevent the platelets of the buffy coat layer which might adhere to the surface of the test sample from being washed away. Thereafter, the test sample on which the platelets might adhere was immersed in a 1.0 mL of a glutaraldehyde solution (Manufacturer: Sigma-Aldrich; Catalogue no.: 49629-250 ML) that has a concentration of 2.5 wt % and that is prepared by mixing glutaraldehyde and PBS, and then left standing at 25° C. for 3 hours. After removal of the glutaraldehyde solution, the test sample was rinsed 3 times with fresh PBS, and then dried using a lens cleaning tissue. Subsequently, the test sample was subjected to imaging and photography using an inverted phase contrast fluorescence microscope (Brand: Nexcope; Model no.: NIB410) of inverted fluorescence microscope system (Manufacturer: Guangzhou Micro-shot Technology Co., Ltd.; Brand: MShot; Model no.: MSG0), and the resultant images were analyzed using Image J software, so as to determine the number of platelets adhering to the test sample. The results are shown in Table 3 below.

4. Water Contact Angle

First, 2 μL of deionized water was dropped on the surface of each of the anti-biofouling silicon wafers of AEX1 to AEX3, CAE1 and CAE2, the anti-biofouling chitosan hydrogel of AEX4, and the control chitosan hydrogel of CAE4 (collectively referred to as "test samples" hereinafter) to form a water droplet. After that, a contact angle goniometer (Manufacturer: First Ten Angstroms, Inc.; Model no.: FTA125) was used to measure the angle between the water droplet and the surface of the test sample. The result for the anti-biofouling silicon wafers of AEX1 to AEX3, CAE1, and CAE2 are shown in Table 3 below, and that for the anti-biofouling chitosan hydrogel of AEX4, and the control chitosan hydrogel of CAE4 are shown in Table 4 below.

5. Whole Blood Cell Adhesion

Blood was drawn from a healthy human donor, and then transferred into a blood bag containing anticoagulant, i.e., heparin, so as to obtain a whole blood sample. Meanwhile, a respective one of the anti-biofouling chitosan hydrogel of AEX4 and the control chitosan hydrogel of CAE4 (collectively referred to as "test samples" hereinafter) each having a size of 1 cm$^2$, was transferred into a 24-well plate, and then 1.0 mL of PBS was added into each of the wells, followed by incubation in an incubator at 37° C. for 12 hours. After removal of PBS, each of the test samples was rinsed 3 times with fresh PBS. Next, the test sample was immersed in 1 mL of the whole blood sample, and then placed in the incubator at 37° C. for 1 hour. After removal of the liquid of the whole blood sample, each of the test samples was rinsed 3 times with fresh PBS. It should be noted that the surface of the test sample was not rinsed so as to prevent the red blood cells and the platelets which might adhere to the surface of the test sample from being washed away. Thereafter, the test sample on which the red blood cells and platelets might adhere was immersed in a 1.0 mL of a glutaraldehyde solution (Manufacturer: Sigma-Aldrich; Catalogue no.: 49629-250 ML) that has a concentration of 2.5 wt % and that is prepared by mixing glutaraldehyde and PBS, and then left standing at 25° C. for 3 hours. After removal of the glutaraldehyde solution, the test sample was rinsed 3 times with fresh PBS, and then dried using a lens cleaning tissue. Subsequently, the test sample was subjected to imaging and photography using an inverted phase contrast fluorescence microscope (Brand: Nexcope; Model no.: NIB410) of inverted fluorescence microscope system (Manufacturer: Guangzhou Micro-shot Technology Co., Ltd.; Brand: MShot; Model no.: MSG0), and the resultant images were analyzed using Image J software, so as to determine the number of blood cells adhering to the test sample. The results are shown in Table 4 below.

6. *Escherichia coli* (*E. coli*) Adhesion

First, 12.5 g of Luria Broth (LB) powder (Manufacturer: Uniregion Bio Tech. Inc.; Catalogue no.: UR-LBB001) and 500 mL of deionized water were added into a 500 mL Schott glass bottle, and after covering the glass bottle with a screw cap, the LB powder and the deionized water were mixed by stirring at room temperature until the LB powder was completely dissolved, so as to obtain LB medium. Next, the LB medium was subjected to a sterilization process at 120° C. for 20 minutes, and then the resultant sterilized LB medium was left to cool until reaching a temperature ranging from 37° C. to 45° C. Thereafter, 25 μL of ampicillin trihydrate (AMP) (Manufacturer: Sigma-Aldrich; Catalogue no.: A6140-5G) was added into 10 mL of the sterilized LB medium, so as to obtain a culture medium. After that, 10 mL of the culture medium and 1 mL of a GFP-expressing *E. coli* inoculum (Sigma-Aldrich; Catalogue no.: IAK0115) having a bacterial concentration of 8×10$^8$ cells/mL were added into a T-75 culture flask, and were cultured in an incubator at 37° C. under a rotation speed of 100 rpm for 16 hours to 18 hours, so as to obtain a bacterial culture of the GFP-expressing *E. coli*. Meanwhile, a respective one of the anti-biofouling chitosan hydrogel of AEX4 and the control chitosan hydrogel of CAE4 (collectively referred to as "test samples" hereinafter) each having a size of 1 cm$^2$, was transferred into a 24-well plate, and then 1.0 mL of PBS was added into each of the wells, followed by incubation in an incubator at 37° C. for 10 hours to 12 hours. After removal of PBS, each of the test samples was rinsed 3 times with fresh PBS. Next, the test sample was immersed in 1.0 mL of the bacterial culture of the GFP-expressing *E. coli*, and then placed in the incubator at 37° C. for 1 hour. After removal of the resultant liquid portion, each of the test samples was rinsed 3 times with fresh PBS to remove impurities and the remaining GFP-expressing *E. coli* which did not adhere to the surface of the test sample. Thereafter, the test sample on which the GFP-expressing *E. coli* might adhere was immersed in a 1 mL of a glutaraldehyde solution (Manufacturer: Sigma-Aldrich; Catalogue no.: 49629-250 ML) that has a concentration of 2.5 vol % and that is prepared by mixing glutaraldehyde and PBS, and then placed in a refrigerator at 4° C. for 3 hours. After removal of the glutaraldehyde solution, the test sample was rinsed 3 times with fresh PBS, and then left in a cool and dry place to be dried. Subsequently, the test sample was subjected to imaging and photography using a desktop scanning electron microscope (Manufacturer: Phenom-World; Brand: Phenom; Model no.: Pro), and the resultant images were analyzed using Image J software, so as to determine the number of GFP-expressing *E. coli* adhering to the test sample. The results are shown in Table 4 below.

Results:

TABLE 3

| | Relative protein adhesion (%) | Water contact angle (°) | Red blood cell adhesion (10$^4$ cells/cm$^2$) | Platelet adhesion (10$^4$ cells/cm$^2$) |
| --- | --- | --- | --- | --- |
| AEX1 | 18.24 | 19.63 | 1.2 | 1.7 |
| AEX2 | 25.99 | 24.52 | 1.4 | 5.2 |
| AEX3 | 24.27 | 26.55 | 2.1 | 5.5 |
| CAE1 | 56.11 | 24.92 | 4.8 | 8.9 |
| CAE2 | 68.35 | 25.00 | 3.6 | 6.8 |

TABLE 4

| | Relative protein adhesion (%) | Water contact angle (°) | Whole blood adhesion (10$^4$ cells/cm$^2$) | *E. coli* adhesion (10$^4$ cells/cm$^2$) |
| --- | --- | --- | --- | --- |
| AEX4 | 18.8 | 57 | 41.69 | 9.13 |
| CAE4 | 100 | 102 | 967.38 | 180.96 |

As shown in Table 3, in comparison with the anti-biofouling silicon wafers of CAE1 and CAE2, the anti-biofouling silicon wafers of AEX1 to AEX3 are capable of effectively reducing adhesion of biological materials, such as proteins, red blood cells, and platelets, on the surface thereof, and thus, has an excellent anti-biofouling property.

As shown in Table 4, in comparison with the control chitosan hydrogel of CAE4, the anti-biofouling chitosan hydrogel of AEX4 is capable of effectively reducing adhesion of biological materials, such as proteins, blood cells (e.g., platelets and red blood cells), tissue cells, and bacteria (e.g., *Escherichia coli*), on the surface thereof, and thus, has an excellent anti-biofouling property.

Summarizing the aforesaid test results, by including the first structural unit represented by formula (I) and the second structural unit represented by formula (II), with the molar ratio of the first structural unit represented by formula (I) to the second structural unit represented by formula (II) ranging from 20:80 to 40:60, the presence of the aldehyde group in the anti-biofouling copolymer of the present disclosure confers stability to the anti-biofouling copolymer and prevents the anti-biofouling copolymer from self-crosslinking reaction, such that the anti-biofouling copolymer can be advantageously grafted on a substrate having amine group on surface thereof, thereby allowing such anti-biofouling copolymer-grafted substrate to have an excellent anti-biofouling property.

Application Example 5 (AEX5)

In order to determine whether an enzyme (e.g., chymotrypsin and xylanase) conjugated with the anti-biofouling copolymer of the present disclosure has an improved thermal stability and enzymatic activity, the following experiments were performed.

First, 0.6242 g of $CH_2=C(CH_3)-C(O)-O-CH_2-C(O)H$ was mixed with 4.9985 g of methanol to form a first solution, 0.02 g of azobisisobutyronitrile was mixed with 4.9985 g of methanol to form a second solution, and 2.0410 g of sulfobetaine methacrylate was mixed with 3.3320 g of water to form a third solution. Next, the first and second solutions were subjected to a reaction with the third solution by mixing under nitrogen atmosphere for 10 minutes, and then stirred at a speed of 300 rpm for 6 hours in a silicon oil bath, so as to form a first mixture including an anti-biofouling copolymer. After that, the first mixture was placed on an ice-water bath at 0° C. for 10 minutes to stop the reaction, so as to obtain a second mixture including a viscous substance that includes the anti-biofouling copolymer and an unreacted solution. Thereafter, the unreacted solution was removed from the second mixture, and methanol was then added to precipitate the anti-biofouling copolymer from the viscous substance. The resultant anti-biofouling copolymer was subjected to a freeze-drying treatment, and then ground, thereby obtaining an anti-biofouling copolymer powder.

The anti-biofouling copolymer powder was dissolved in a Tris buffer solution (pH 8.0) at 60° C. for 1 hour to form an anti-biofouling copolymer solution, which has a concentration of 0.5 mg/mL, and in which a molar ratio of $CH_2=C(CH_3)-C(O)-O-CH_2-C(O)H$ to sulfobetaine methacrylate was 40:60. Then, the anti-biofouling copolymer solution was mixed with 0.1 mg/mL of bovine serum albumin (serving as a protective agent) and a chymotrypsin solution under stirring at 40° C. for 1 hour, so as to form a protein mixture solution, in which a concentration of chymotrypsin was 1 mg/mL. Thereafter, the protein mixture solution was placed in a hot-air circulation oven having a temperature of 40° C., followed by conducting a conjugation reaction in a shaking oven at a speed of 110 rpm for 4 hours, such that the anti-biofouling copolymer was conjugated on the chymotrypsin, so as to form an anti-biofouling copolymer-conjugated chymotrypsin of AEX5. The anti-biofouling copolymer-conjugated chymotrypsin of AEX5 was subjected to gas permeation chromatography to determine molecular weight thereof.

For clarity, the molar ratio of $CH_2=C(CH_3)-C(O)-O-CH_2-C(O)H$ to sulfobetaine methacrylate, the molecular weight and concentration of the anti-biofouling copolymer, the concentration of chymotrypsin, and the temperature and time period of the conjugation reaction, are summarized and shown in Table 5 below.

TABLE 5

| | Anti-biofouling copolymer | | | Concentration of | Conjugation reaction | |
| --- | --- | --- | --- | --- | --- | --- |
| | Molar ratio of $CH_2=C(CH_3)-C(O)-O-CH_2-C(O)H$ to sulfobetaine methacrylate | Molecular weight (kDa) | Concentration of anti-biofouling copolymer in anti-biofouling copolymer solution (mg/mL) | chymotrypsin in protein mixture solution (mg/mL) | Temperature | Time period (hours) |
| AEX5 | 40:60 | 1532.42 | 0.5 | 1.0 | 40 | 4 |

Control Chymotrypsin

The chymotrypsin as described in AEX5, which was not conjugated with the anti-biofouling copolymer, directly serves as a control test sample.

Figure 4:
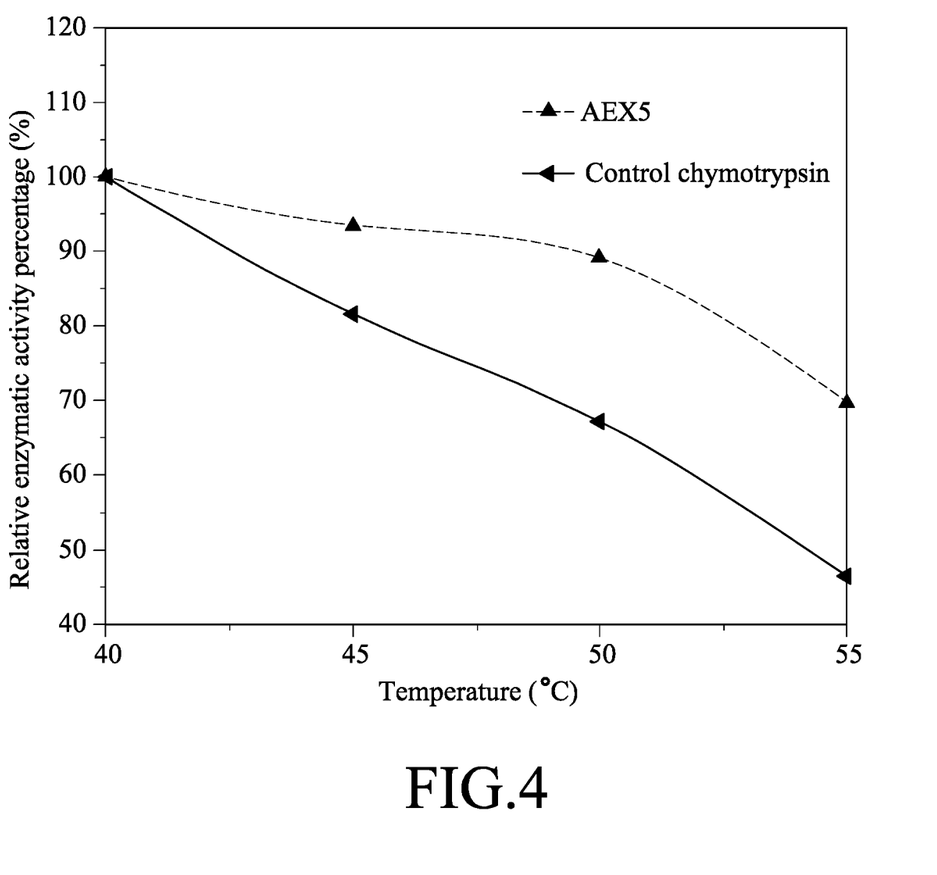
FIG. 4 is a graph showing relative enzymatic activity percentages of anti-biofouling copolymer-conjugated chymotrypsin of Application Example 5 and control chymotrypsin determined at different temperatures.

Enzymatic Activity of Anti-Biofouling Copolymer-Conjugated Chymotrypsin of AEX5 and Control Chymotrypsin First, 0.02 mg/mL of N-succinyl-ala-ala-pro-phe p-nitroanilide solution was prepared as a colorimetric enzyme substrate for the anti-biofouling copolymer-conjugated chymotrypsin of AEX5 and the control chymotrypsin. Thereafter, 0.5 mL of the N-succinyl-ala-ala-pro-phe p-nitroanilide solution was added to each well of a 24-well plate which contained 200 μL of either the anti-biofouling copolymer-conjugated chymotrypsin of AEX5 or the control chymotrypsin, followed by placing the 24-well plate in a hot-air circulation oven so as to allow the anti-biofouling copolymer-conjugated chymotrypsin of AEX5 or the control chymotrypsin to be reacted with the N-succinyl-ala-ala-pro-phe p-nitroanilide solution at one of 40° C., 45° C., 50° C. and 55° C. for 30 minutes. Subsequently, 200 μL of the resultant test sample containing either the anti-biofouling copolymer-conjugated chymotrypsin of AEX5 or the control chymotrypsin was aspirated from the well using a pipette and then transferred into a 96-well plate, and then subjected to light absorbance measurement at a wavelength of 412 nm ($OD_{412}$) using a microplate spectrophotometer (Manufacturer: BMG Labtech; Model no.: SPECTROstar Nano), so as to determine the enzymatic activity of the test sample. Relative enzymatic activity percentage of the test sample can be calculated by substituting the light absorbance into the following formula:

$$A=(B/C)\times100 \quad (1)$$

A=relative enzymatic activity percentage (%)

B=$OD_{412}$ of the test sample containing the anti-biofouling copolymer-conjugated chymotrypsin of AEX5

C=$OD_{412}$ of the test sample containing the control chymotrypsin

The results are shown in FIG. 4 and Table 6 below.

FIG. 4 is a graph showing relative enzymatic activity percentages of the anti-biofouling copolymer-conjugated chymotrypsin of AEX5 and the control chymotrypsin determined at different temperatures. When the control chymotrypsin was reacted with the N-succinyl-ala-ala-pro-phe p-nitroanilide solution, the relative enzymatic activity percentage of the control chymotrypsin significantly decreased from 100% at 40° C. to less than 50% at 55° C. In contrast, when the anti-biofouling copolymer-conjugated chymotrypsin of AEX5 was reacted with the N-succinyl-ala-ala-pro-phe p-nitroanilide solution, the relative enzymatic activity percentage of the anti-biofouling copolymer-conjugated chymotrypsin of AEX5 only decreased from 100% at 40° C. to about 70% at 55° C.

TABLE 6

| | Relative enzymatic activity at elevated temperatures | | | |
|---|---|---|---|---|
| | 40° C. | 45° C. | 50° C. | 55° C. |
| AEX5 | 100 | 96.88 | 90.43 | 70.15 |
| CAE5 | 100 | 92.74 | 87.46 | 69.16 |

These results suggest that, in comparison to the control chymotrypsin, since the aldehyde group of $CH_2$=$C(CH_3)$—$C(O)$—$O$—$CH_2$—$C(O)H$ of the anti-biofouling copolymer can be stably grafted to the lysine residue of the chymotrypsin to form a Schiff base compound, the anti-biofouling copolymer-conjugated chymotrypsin of AEX5 has an improved enzymatic activity at elevated temperatures, and thus has an excellent thermal stability. In addition, since sulfobetaine methacrylate at side chains of the anti-biofouling copolymer has good biocompatibility due to being a zwitterion molecule, the possibility of the anti-biofouling copolymer-conjugated chymotrypsin of AEX5 being rejected by the human body may be reduced.

Application Example 6 (AEX6)

First, 0.3121 g of $CH_2$=$C(CH_3)$—$C(O)$—$O$—$CH_2$—$C(O)H$ was mixed with 5.68875 g of methanol to form a first solution, 0.02 g of azobisisobutyronitrile was mixed with 5.68875 g of methanol to form a second solution, and 2.7220 g of sulfobetaine methacrylate was mixed with 3.7925 g of water to form a third solution. Next, the first and second solutions were subjected to a reaction with the third solution by mixing under nitrogen atmosphere for 10 minutes, and then stirred at a speed of 300 rpm for 6 hours in a silicon oil bath, so as to form a first mixture including an anti-biofouling copolymer. After that, the first mixture was placed on an ice-water bath at 0° C. for 10 minutes to stop the reaction, so as to obtain a second mixture including a viscous substance that includes the anti-biofouling copolymer and an unreacted solution. Thereafter, the unreacted solution was removed from the second mixture, and methanol was then added to precipitate the anti-biofouling copolymer from the viscous substance. The resultant anti-biofouling copolymer was subjected to a freeze-drying treatment, and then ground, thereby obtaining an anti-biofouling copolymer powder.

The anti-biofouling copolymer powder was dissolved in 0.1 M of NaOH solution at 60° C. for 1 hour to form an anti-biofouling copolymer solution, which has a concentration of 4 mg/mL, and in which a molar ratio of $CH_2$=$C(CH_3)$—$C(O)$—$O$—$CH_2$—$C(O)H$ to sulfobetaine methacylate was 20:80. Then, the anti-biofouling copolymer solution was mixed a xylanase solution under stirring at 40° C. for 1 hour, so as to form a protein mixture solution, in which a concentration of xylanase was 0.2 mg/mL. Thereafter, the protein mixture solution was placed in a hot-air circulation oven having a temperature of 40° C., followed by conducting a conjugation reaction in a shaking oven at a speed of 110 rpm for 1 hour, such that the anti-biofouling copolymer was conjugated on the xylanase, so as to form an anti-biofouling copolymer-conjugated xylanase of AEX6. The anti-biofouling copolymer-conjugated xylanase of AEX6 was subjected to gas permeation chromatography to determine molecular weight thereof.

For clarity, the molar ratio of $CH_2$=$C(CH_3)$—$C(O)$—$O$—$CH_2$—$C(O)H$ to sulfobetaine methacrylate, the molecular weight and concentration of the anti-biofouling copolymer, the concentration of xylanase, and the temperature and time period of the conjugation reaction, are summarized and shown in Table 7 below.

TABLE 7

| | Anti-biofouling copolymer | | | Conjugation reaction | |
|---|---|---|---|---|---|
| | Molar ratio of $CH_2$=$C(CH_3)$—$C(O)$—$O$—$CH_2$—$C(O)H$ to sulfobetaine methacrylate | Molecular weight (kDa) | Concentration of anti-biofouling copolymer in anti-biofouling copolymer solution (mg/mL) | Concentration of xylanase in protein mixture solution (mg/mL) | Temperature | Time period (hours) |
| AEX6 | 20:80 | 1089.33 | 4 | 0.2 | 40 | 1 |

Control Xylanase

The xylanase as described in AEX6, which was not treated with the anti-biofouling copolymer, directly serves as a control test sample.

Figure 5:
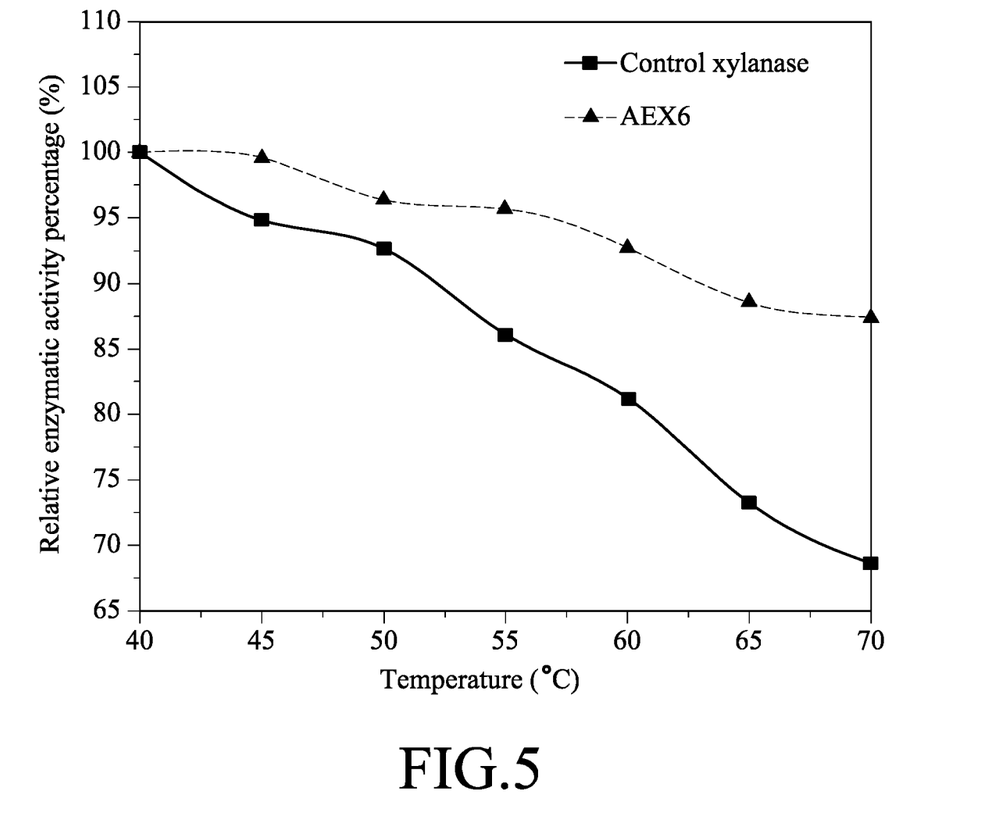
FIG. 5 is a graph showing relative enzymatic activity percentages of anti-biofouling copolymer-conjugated xylanase of Application Example 6 and control xylanase determined at different temperatures.

Enzymatic Activity of Anti-Biofouling Copolymer-Conjugated Xylanase of AEX6 and Control Xylanase First, 0.3 mg/mL of 3-amino-5-nitrosalicylic acid solution was prepared as a colorimetric enzyme substrate for the anti-biofouling copolymer-conjugated xylanase of AEX6 and the control xylanase. Thereafter, 0.5 mL of the 3-amino-5-nitrosalicylic acid solution was added to each well of a 24-well plate which contained 200 µL of the anti-biofouling copolymer-conjugated xylanase of AEX6 or the control xylanase, followed by placing the 24-well plate in a hot-air circulation oven so as to allow the anti-biofouling copolymer-conjugated chymotrypsin xylanase of AEX6 or the control xylanase to be reacted with the 3-amino-5-nitrosalicylic acid solution at one of 40° C., 45° C., 50° C., 55° C., 60° C., 65° C., and 70° C. for 30 minutes. Subsequently, 200 µL of the resultant test sample containing the anti-biofouling copolymer-conjugated xylanase of AEX6 or the control xylanase was aspirated from the test sample using a pipette and then transferred into a 96-well plate, and then subjected to light absorbance measurement at a wavelength of 540 nm ($OD_{540}$) using a microplate spectrophotometer (Manufacturer: BMG Labtech; Model no.: SPECTROstar Nano), so as to determine the enzymatic activity of the test sample. Relative enzymatic activity percentage of the test sample can be calculated by substituting the light absorbance into the following formula:

$$D=(E/F)\times 100 \qquad (2)$$

D=relative enzymatic activity percentage (%)
E=$OD_{540}$ of the test sample containing the anti-biofouling copolymer-conjugated xylanase of AEX6
F=$OD_{540}$ of the test sample containing the control xylanase The results are shown in FIG. 5 and Table 8 below.

FIG. 5 is a graph showing relative enzymatic activity percentages of the anti-biofouling copolymer-conjugated xylanase of AEX6 and the control xylanase determined at different temperatures. When the control xylanase was reacted with the 3-amino-5-nitrosalicylic acid solution, the relative enzymatic activity percentage of the control xylanase significantly decreased from 100% at 40° C. to a range of 65% to 70% at 70° C. In contrast, when the anti-biofouling copolymer-conjugated xylanase of AEX6 was reacted with the 3-amino-5-nitrosalicylic acid solution, the relative enzymatic activity percentage of the anti-biofouling copolymer-conjugated xylanase of AEX6 only decreased from 100% at 40° C. to a range of 85% to 90% at 70° C.

TABLE 8

| | Relative enzymatic activity at elevated temperatures | | | |
|---|---|---|---|---|
| | 40° C. | 50° C. | 60° C. | 70° C. |
| AEX6 | 100 | 96.39 | 92.77 | 87.46 |
| CAE6 | 100 | 92.67 | 81.24 | 68.64 |

These results suggest that, in comparison to the control xylanase, since the aldehyde group of $CH_2=C(CH_3)-C(O)-O-CH_2-C(O)H$ of the anti-biofouling copolymer can be stably grafted to the lysine residue of the xylanase to form a Schiff base compound, the anti-biofouling copolymer-conjugated xylanase of AEX6 has an improved enzymatic activity at elevated temperatures, and thus has an excellent thermal stability. In addition, since sulfobetaine methacrylate at side chains of the anti-biofouling copolymer has good biocompatibility due to being a zwitterion molecule, the possibility of the anti-biofouling copolymer-conjugated xylanase of AEX6 being rejected by the human body may be reduced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An anti-biofouling copolymer, comprising:
a first structural unit represented by formula (I); and
a second structural unit represented by formula (II), wherein
a molar ratio of the first structural unit represented by formula (I) to the second structural unit represented by formula (II) ranges from 20:80 to 40:60,
$R^1$ and $R^2$ independently represent hydrogen or methyl,
X represents O or NH, and
Z represents $N^+(CH_3)_2-(CH_2)_3-SO_3^-$.

2. The anti-biofouling copolymer as claimed in claim 1, wherein $R^1$ and $R^2$ independently represent methyl.

3. The anti-biofouling copolymer as claimed in claim 1, wherein X represents O.

4. The anti-biofouling copolymer as claimed in claim 1, wherein the molar ratio of the first structural unit represented by formula (I) to the second structural unit represented by formula (II) is 20:80.

5. A method for preparing an anti-biofouling copolymer, comprising:

subjecting a first compound represented by formula (a) to a polymerization reaction with a second compound represented by formula (b), (a)

(b)

wherein
$R^3$ and $R^4$ independently represent hydrogen or methyl,
$X^1$ represents O or NH,
$Z^1$ represents $N^+(CH_3)_2$—$(CH_2)_3$—$SO_3^-$, and
a molar ratio of the first compound represented by formula (a) to the second compound represented by formula (b) ranges from 20:80 to 40:60.

6. The method as claimed in claim 5, wherein the molar ratio of the first compound represented by formula (a) to the second compound represented by formula (b) is 20:80.

7. The method as claimed in claim 5, wherein the first compound represented by formula (a) is $CH_2$=$C(CH_3)$—$C(O)$—$O$—$CH_2$—$C(O)H$.

8. The method as claimed in claim 5, wherein the second compound represented by formula (b) is sulfobetaine methacrylate.

* * * * *